United States Patent [19]

Darbonne et al.

[11] Patent Number: 5,093,145
[45] Date of Patent: Mar. 3, 1992

[54] PROCESS FOR TREATING AN AROMATIC PLANT OR HERB, OR A PLANT CONTAINING ESSENTIAL OILS

[75] Inventors: Luc Darbonne, Milly la Foret; Jacques Bain, Mont Saint Aignan, both of France

[73] Assignee: Daregal, France

[21] Appl. No.: 548,232

[22] Filed: Jul. 5, 1990

[30] Foreign Application Priority Data

Jul. 4, 1989 [FR] France ............................... 89 08956

[51] Int. Cl.$^5$ ............................................... A23L 1/22
[52] U.S. Cl. ........................................ 426/615; 426/638
[58] Field of Search ............... 426/638, 330, 455, 615, 426/597

[56] References Cited

U.S. PATENT DOCUMENTS

| | | | |
|---|---|---|---|
| 2,971,844 | 2/1961 | Bosanac | 426/597 |
| 3,594,194 | 7/1971 | Ricci | 426/638 |
| 3,694,236 | 9/1972 | Edlin | 99/199 |
| 3,709,694 | 1/1973 | Killinger | 426/597 |
| 3,952,112 | 4/1976 | Fulger et al. | 426/321 |
| 4,202,912 | 5/1980 | Kim | 426/638 |
| 4,313,967 | 2/1982 | Kahn et al. | 426/327 |
| 4,361,589 | 11/1982 | Wauters et al. | 426/270 |
| 4,514,428 | 4/1985 | Glass et al. | 426/321 |
| 4,542,033 | 9/1985 | Agarwala | 426/321 |
| 4,832,969 | 5/1989 | Lioutas | 426/270 |

FOREIGN PATENT DOCUMENTS 1483805  8/1977  United Kingdom .

OTHER PUBLICATIONS

Gee et al, "Some Concepts for the Development of Intermediate Moisture Foods", *Food Technology*—vol. 31, No. 4, Apr. 1977, pp. 58-64.

*Primary Examiner*—Carolyn Paden
*Attorney, Agent, or Firm*—Hill, Van Santen, Steadman & Simpson

[57] ABSTRACT

A process for treating an aromatic plant or herb or plants containing essential oils comprises a combination of operational phases which consist of effecting an enzyme blocking of the herb or plant; of a deep-freezing of the plant or herb; of an impregnating the herb or plant with the purpose of sequestering the water and flavors which are contained therein; and of drying and dehydrating the herb or plant at moderate temperatures.

10 Claims, No Drawings

PROCESS FOR TREATING AN AROMATIC PLANT OR HERB, OR A PLANT CONTAINING ESSENTIAL OILS

BACKGROUND OF THE INVENTION

The invention relates to the treatment of aromatic plants or herbs, or of plants containing essential oils (hereinafter named plants).

The plants to which the invention relates are, typically, parsley, chives, thyme, etc., or vegetables. Spices and dry products are excluded therefrom.

Three main presentation methods are known for such plants: fresh, deep-frozen or dehydrated. Presentation in the fresh state has the advantage of good organoleptic qualities, but the disadvantage of a limited preservation period which may be inconvenient. Deep-freezing overcomes this inconvenience, but involves implementing a costly cold chain which can present the risk of being interrupted. Dehydrated presentation permits easy preservation for a long time, but the organoleptic qualities of the plants presented in this manner are generally inferior to those obtained in the fresh state. These organoleptic qualities consist mainly of texture, color, flavor or taste. To these there is added functionality, that is to say the possibility of being utilized under the desired conditions.

It is therefore an aim of the invention to present plants such as aromatic plants or herbs, or plants containing essential oils, in such a way that their organoleptic qualities are identical, or come very close to, those of the fresh state and, at the same time, they can be preserved under conditions comparable to those of the dehydrated state, taking into account the advantages which they present.

According to document U.S. Pat. No. 4,514,428, snacks in the form of apple slices are produced by means of a succession of washing, anti-browning, sugar-impregnation and drying steps. Such a process, which is very specific, does not allow aromatic plants or herbs, or plants containing essential oils, to be treated for the object aimed at above.

Document U.S. Pat. No. 4,313,967 relates to a food product which is stable from the microbiological point of view and which contains a fruit such as grape, date, plum, apricot, apple, peach, cherry or lemon. This product has a water activity of between 0.008 and 0.93.

The document FOOD TECHNOLOGY, vol. 31, no. 4, April 1977, pages 58 to 64, relates to food products of medium humidity and discloses the effects of various additives on the water content.

Documents U.S. Pat. No. 3,952,112, U.S. Pat. No. 4,832,969, U.S. Pat. No. 3,694,236, U.S. Pat. No. 4,361,589, GB-A-1,483,805 and U.S. Pat. No. 4,542,033 disclose the use of sorbitol or glycerol as a humectant for grapes; the production of a dried green vegetable packaged in a black, sealed, oxygen-tight bag; the production of a dried food dehydrated by using Xanthomonas; the production of dried celery by using sugar, followed by drying; and the treatment of whole dried fruits.

SUMMARY OF THE INVENTION

The abovementioned objects are achieved by the invention, namely processes for treating aromatic plants or herbs, or plants containing essential oils, using combinations of operational phases which consist of effecting an enzyme blocking of the herb or of the plant; of deep-freezing the herb or the plant; of impregnating the herb or the plant with the purpose of sequestering the water and the flavors which it contains; of drying and dehydrating the herb or the plant at a moderate temperature up to the point where its water activity is lower than approximately 0.6, for a residual water content of less than 20%.

Enzyme blocking is implemented by bringing the herb or the plant into contact with an aqueous solution which is composed of additives (stabilizer, antioxidant, agent for reducing the water activity). Deep-freezing of the herb or the plant is of the IQF (individual quick freezing) type. Sequestration of the water and the flavors of the herb or the plant is achieved by bringing the latter into contact with an aqueous solution containing additives (stabilizers, antioxidant, flavor retainer and taste enhancer).

The other characteristics of the invention will emerge from the description to follow.

DESCRIPTION OF THE PREFERRED EMBODIMENTS

The invention relates to treatment processes for aromatic plants or herbs, or plants containing essential oils, (typically parsley, chives, thyme etc., or also vegetables, with the exception of spices and dry products).

In principle, these processes have the aim of improving the organoleptic qualities of the herbs or plants treated in this way and, in combination, permitting their preservation under conditions which are comparable to those of the dehydrated state.

These processes use combinations of functional operational phases, that is to say, a phase in which a fresh plant or herb which has recently been harvested is subjected to enzyme blocking (phase I), a phase in which the herb or the plant is deep-frozen (phase II), a phase in which the water and the flavors of the plant are sequestered (phase III), and a phase in which the herb or the plant is dried and dehydrated at a moderate temperature up to the point where its water activity WA is lower than approximately 0.6, for a residual water content of less than 20% (phase IV).

The deep-freezing phase II is of the IQF (individual quick freezing) type.

In phases I and III, the herb or the plant is brought into contact with an aqueous solution which comprises, principally, water and functional additives. This phase of bringing the herb or the plant into contact with this solution is effected by immersion.

The aqueous solution used in phase I comprises at least 80% of water and, as additives:

At least one stabilizer selected from the group comprising sorbitol, a polyol such as mannitol, xylitol, glycerol, a sugar such as sucrose, glucose, lactose, maltodextrin of $12 \leq DE$ to less than $\leq 30$ or equivalent, in a proportion of between 5 and 10%.

At least one antioxidant selected from the group comprising ascorbic acid, sodium ascorbate, alphatocopherol, butylhydroxyanisole, butylhydroxytoluene, sodium sulfite, sodium hydrogen sulfite, sodium disulfite, potassium disulfite and calcium disulfite or equivalent, in a proportion of between 1.5% and 3%.

At least one agent which reduces the water activity selected from the group comprising calcium chloride, sodium chloride, orthophosphoric acid, sodium lactate and calcium lactate or equivalent, in a proportion of between 0.5% and 1%.

All the proportions given in the text are understood to be by weight and extend to those values which are extreme but close to the limits indicated, around these limits. The lists of substances extend to the functional equivalents.

The solution used in phase I has a dry-matter content of 7 to 8% approximately (measured by means of a refractometer), and a pH of between 2.5 and 3.5 approximately (at 20° C.).

The temperature of the aqueous solution used in phase I is between approximately 35° C. and 55° C. and, preferably, it is as close to 35° C. as possible. The duration of the immersion of the fresh herb or plant is of the order of a few minutes. For example, the durations of immersion can be 3, 4 or 6 minutes approximately, for solution temperatures of 55°, 45° and 35° C., respectively.

The solution used in phase III comprises at least 60% of water and, as additives:

At least one stabilizer selected from the group comprising sorbitol, a polyol such as mannitol, xylitol, glycerol, a sugar such as sucrose, glucose, lactose, maltodextrin of $12 \leq DE$ to less than $\leq 30$ or equivalent, in a proportion of between 20 and 40%.

At least one antioxidant selected from the group comprising ascorbic acid, sodium ascorbate, alphatocopherol, butylhydroxyanisole, butylhydroxytoluene, sodium sulfite, sodium hydrogen sulfite, sodium disulfite, potassium disulfite and calcium disulfite or equivalent, in a proportion of between 0.20% and 0.45%.

At least one flavor retainer selected from the group comprising gum arabic, carboxymethylcellulose, modified starch, ethylmaltol or equivalent, in a proportion of between 0.9% and 1.8%.

At least one taste enhancer such as monosodium glutamate or equivalent, in a proportion of between 1 and 2% approximately.

This solution has a dry-matter content (measured by means of a refractometer) of between 25 and 40% approximately. Its pH is between 4.5 and 6.5 approximately (at 20° C.). Its use temperature is between 10° C. and 50° C. It is preferably equal to, or close to, 20° to 30° C. The duration of immersion is inversely proportional to the temperature. It is between 15 and 50 min approximately and, preferably, between 30 and 40 min approximately.

In phase III, the durations of immersion can be as follows, as a function of the temperature of the solution:
Temperature: 10, 15, 20, 25, 30, 35, 40, 45, 50
Immersion time in minutes: 50, 45, 40, 35, 30, 25, 21, 17, 15.

Phase I follows an initial state, using a fresh herb or plant which has been harvested recently. This phase is followed by an intermediate phase in which the herb or the plant is drained once the latter has been immersed into an aqueous solution of phase I.

Phase III is carried out with agitation. Deep-freezing of the herb or the plant by the IQF method permits the herb or the plant to be in the divided state.

Phase III is followed by an intermediate sieving phase which allows the herb or the plant to be separated from the aqueous solution of phase III.

The dehydration and drying phase IV is carried out at a temperature of the herb or the plant during drying of between 50° and 65° C. approximately. This phase IV allows an appropriate amount of water to be eliminated by dehydration so that a water activity (WA) of between 0.3 and 0.6 approximately is achieved for a residual water content of 10 to 20% approximately.

Excellent results were obtained by using, in phase I, sorbitol, ascorbic acid and calcium chloride in the following percentages: 6%, 1.5% and 0.5%, which are added to 92% of water. And, in phase III, by using sorbitol, gum arabic, monosodium glutamate and ascorbic acid in the following percentages: 27%, 1.26%, 1.44% and 0.3%.

As regards the aqueous solution of phase III, several tests were carried out which gave excellent results. These tests emerge from the following table (the values are given in %):

| Concentration | 25 | 30 | 35 | 40 |
|---|---|---|---|---|
| Water | 75 | 70 | 65 | 60 |
| Sorbitol | 22.5 | 27 | 31.5 | 36 |
| Gum arabic | 1.05 | 1.26 | 1.47 | 1.68 |
| Monosodium glutamate | 1.2 | 1.44 | 1.68 | 1.92 |
| Ascorbic acid | 0.25 | 0.3 | 0.35 | 0.4 |

The proportion of treated herb or plant in phase III depends on the concentration of the solution used in this phase, as well as on the state of the herb or plant (fresh or deep-frozen state). This ratio of quantity of treated herb or plant to concentration of solution used is generally linear and increasing. For the extreme values contemplated, as regards the concentration, i.e. 25% and 40%, the percentages of the products to be treated are:
in the fresh state, 8 and 13
in the deep-frozen state, 10 and 18.
These figures are indicative.

In a first possible variant, phases I and II are combined with the intermediate draining phase. This permits the aromatic plants or herbs, or the plants containing essential oils, to be obtained deep-frozen, starting from fresh herbs or plants with improved organoleptic qualities.

In a second possible variant, phase I is combined with a conventional dehydration phase and, in an intermediate manner, a draining phase. This permits dehydrated aromatic plants or herbs, or dehydrated plants containing essential oils, to be obtained which likewise have improved organoleptic qualities.

In a third variant, phase II, phase III and phase IV are combined, with the abovementioned sieving between phases II and III. This permits dried herbs or plants of medium moisture content to be obtained. One either starts with herbs or plants which are already deep-frozen, in which case the initial phase I cannot be effected, or one starts with fresh herbs or plants, and the initial phase I is effected. In both variants, a herb or plant is obtained which, in comparison with a conventionally dehydrated product, restores the qualities of a fresh herb or plant upon rehydration, in particular as regards the color and the flavor. Moreover, the rehydration is virtually instantaneous. To illustrate the effects obtained by implementing the invention, it can be said that the rehydration rate A ($=Pm/Po$ where $Po=10$ g) at 60° C. is of the order of 6 for herbs treated in accordance with the third variant as against of the order of only 3.5 for conventionally dehydrated herbs.

We claim:

1. A process for treating an aromatic plant or herb, or a plant containing essential oils, which comprises:
providing a fresh herb or plant which has been harvested recently; and immersing this herb or plant in an aqueous solution which comprises at least 80% by weight of water and has additives including:

at least one stabilizer selected from the group comprising sorbitol, a polyol such as mannitol, xylitol, glycerol, a sugar such as sucrose, glucose, lactose, maltodextrin of $12 \leq DE \leq 30$ or equivalent, in a proportion by weight of between 5% and 10% approximately;

at least one antioxidant selected from the group comprising ascorbic acid, sodium ascorbate, alphatocopherol, butylhydroxyanisole, butylhydroxytoluene, sodium sulfite, sodium hydrogen sulfite, sodium disulfite, potassium disulfite and calcium sulfite, or equivalent, in a proportion by weight of between 1.5% and 3% approximately;

at least one agent which reduces the water activity selected from the group comprising calcium chloride, sodium chloride, orthophosphoric acid, sodium lactate and calcium lactate or equivalent, in a proportion by weight of between 0.5% and 1% approximately;

this solution having a dry-matter content of 7 to 8% approximately, a pH at 20° C. of between 2.5 and 3.5 approximately, a temperature between approximately 35° C. and 55° C. and, preferably, as close to 35° C. as possible, the immersion duration being of the order of several minutes.

2. A process for treating an aromatic plant or herb, or a plant containing essential oils, which comprises:

providing a fresh herb or plant which has been harvested recently;

immersing this herb or plant in an aqueous solution which comprises at least 80% by weight of water and has additives including:

at least one stabilizer selected from the group comprising sorbitol, a polyol such as mannitol, xylitol, glycerol, a sugar such as sucrose, glucose, lactose, maltodextrin of $12 \leq DE \leq 30$ or equivalent, in a proportion by weight of between 5% and 10% approximately:

at least one antioxidant selected from the group comprising ascorbic acid, sodium ascorbate, alphatocopherol, butylhydroxyanisole, butylhydroxytoluene, sodium sulfite, sodium hydrogen sulfite, sodium disulfite, potassium disulfite and calcium sulfite or equivalent, in a proportion by weight of between 1.5% and 3% approximately;

at least one agent which reduces the water activity selected from the group comprising calcium chloride, sodium chloride, orthophosphoric acid, sodium lactate and calcium lactate or equivalent, in a proportion by weight of between 0.5% and 1% approximately;

this solution having a dry-matter content of 7 to 8% approximately, a pH at 20° C. of between 2.5 and 3.5 approximately, a temperature between approximately 35° C. and 55° C. and, preferably, as close to 35° C. as possible, the immersion duration being of the order of several minutes;

draining the herb or the plant after immersion; and deep-freezing the herb or plant which has been drained in this way.

3. The process as claimed in claim 2, wherein the herb or the plant is deep-frozen in accordance with the IQF "Individual Quick Freezing" process.

4. A process for treating an aromatic plant or herb, or a plant containing essential oils, which comprises:

providing a fresh herb or plant which has been harvested recently;

immersing this herb or plant in an aqueous solution which comprises at least 80% by weight of water and has additives including:

at least one stabilizer selected from the group comprising sorbitol, a polyol such as mannitol, xylitol, glycerol, a sugar such as sucrose, glucose, lactose, maltodextrin of $12 \leq DE \leq 30$ or equivalent, in a proportion by weight of between 5% and 10% approximately;

at least one antioxidant selected from the group comprising ascorbic acid, sodium ascorbate, alphatocopherol, butylhydroxyanisole, butylhydroxytoluene, sodium sulfite, sodium hydrogen sulfite, sodium disulfite, potassium disulfite and calcium sulfite, in a proportion by weight of between 1.5% and 3% approximately or equivalent;

at least one agent which reduces the water activity selected from the group comprising calcium chloride, sodium chloride, orthophosphoric acid, sodium lactate and calcium lactate or equivalent, in a proportion by weight of between 0.5% and 1% approximately;

this solution having a dry-matter content of 7 to 8% approximately, a pH at 20° C. of between 2.5 and 3.5 approximately, a temperature between approximately 35° C. and 55° C. and, preferably, as close to 35° C. as possible, the immersion duration being of the order of several minutes;

draining the herb or the plant after immersion; and deep-freezing the herb or plant which has been drained in this way.

5. A process for treating an aromatic plant or herb, or a plant containing essential oils, which comprises:

providing a deep-frozen herb or plant;

immersing this herb or plant, which has been deep-frozen in this way, with agitation, in an aqueous solution comprising at least 60% by weight of water and with additives including:

at least one stabilizer selected from the group comprising sorbitol, a polyol such as mannitol, xylitol, glycerol, a sugar such as sucrose, glucose, lactose, maltodextrin of $12 \leq DE \leq 30$ or equivalent, in a proportion by weight of between 15% and 40% approximately;

at least one antioxidant selected from the group comprising ascorbic acid, sodium ascorbate, alphatocopherol, butylhydroxyanisole, butylhydroxytoluene, sodium sulfite, sodium hydrogen sulfite, sodium disulfite, potassium disulfite and calcium sulfite or equivalents, in a proportion by weight of between 0.15% and 0.5% approximately;

at least one flavor retainer selected from the group comprising gum arabic, carboxymethylcellulose, modified starch, ethyl maltol or equivalents, in a proportion by weight of between 0.9% and 1.8% approximately;

at least one taste enhancer such as monosodium glutamate or equivalent, in a proportion by weight of between 1% and 2% approximately;

this solution having a dry-matter content of 25 to 40% approximately, a pH at 20° C. of between 4.5 and 6.5 approximately, a temperature of between 10° C. and 50° C. and, preferably, equal to, or close to, 20° to 30° C. approximately, the duration of immersion, which is inversely proportional to the temperature, being between 15 and 50 minutes approximately, and preferably between 30 and 40 minutes approximately;

sieving the herb or the plant after immersion; and dehydrating the herb or the plant, which has been sieved in this way.

6. A process for treating an aromatic plant or herb, or a plant containing essential oils, which comprises:

providing a deep-frozen herb or plant;

immersing this herb or plant, which has been deep-frozen in this way, with agitation, in an aqueous solution comprising at least 60% by weight of water and with additives including:

at least one stabilizer selected from the group comprising sorbitol, a polyol such as mannitol, xylitol, glycerol, a sugar such as sucrose, glucose, lactose, maltodextrin of $12 \leq DE \leq 30$ or equivalent, in a proportion by weight of between 20% and 40% approximately;

at least one antioxidant selected from the group comprising ascorbic acid, sodium ascorbate, alphatocopherol, butylhydroxyanisole, butylhydroxytoluene, sodium sulfite, sodium hydrogen sulfite, sodium disulfite, potassium disulfite and calcium sulfite or equivalents, in a proportion by weight of between 0.2% and 0.45% approximately;

at least one flavor retainer selected from the group comprising gum arabic, carboxymethylcellulose, modified starch, ethyl maltol or equivalents, in a proportion by weight of between 0.9% and 1.8% approximately;

at least one taste enhancer such as monosodium glutamate or equivalent, in a proportion by weight of between 1% and 2% approximately;

this solution having a dry-matter content of 25 to 40% approximately, a pH at 20° C. of between 4.5 and 6.5 approximately, a temperature of between 10° C. and 50° C. and, preferably, equal to, or close to, 20° to 30° C. approximately, the duration of immersion, which is inversely proportional to the temperature, being between 15 and 50 minutes approximately, and preferably between 30 and 40 minutes approximately;

sieving the herb or the plant after immersion; and drying the herb or plant which has been sieved in this way at a temperature of between approximately 50° C. and 65° C. up to the point where its water activity is of the order of 0.3 to 0.6, for a residual water content of the order of 10 to 20%, so as to obtain a dried herb or plant which rehydrates rapidly and which has improved organoleptic qualities.

7. A process for treating an aromatic plant or herb, or a plant containing essential oils, which comprises:

providing a fresh herb or plant which has been harvested recently;

immersing this herb or plant in an aqueous solution of water and with additives including:

at least one stabilizer such as sorbitol or equivalent, in a proportion by weight of less than 10% approximately;

at least one antioxidant;

at least one agent which reduces water activity, such as calcium chloride or equivalent;

this solution having a dry-matter content of 7 to 8% approximately, a pH at 20° C. of between 2.5 and 3.5 approximately, a temperature between approximately 30° C. and 60° C. and, preferably, as close to 30° C. as possible, the duration of immersion being of the order of several minutes;

draining the herb or the plant after immersion; and deep-freezing the herb or the plant which has been drained in this way;

immersing the herb or plant which has been deep-frozen in this way in an aqueous solution comprising water with additives including:

at least one stabilizer such as sorbitol or equivalent;

at least one antioxidant;

at least one flavor retainer such as gum arabic or equivalent;

at least one taste enhancer such as monosodium glutamate or equivalent;

this solution having a dry-matter content of 25 to 40% approximately, a pH at 20° C. of between 4.5 and 6.5 approximately, a temperature of between approximately 10° C. and 50° C. and, preferably, equal to, or close to, 20° to 30° C. approximately, the duration of immersion, which is inversely proportional to the temperature, being between 15 and 50 minutes approximately, and, preferably, between 30 and 40 minutes approximately;

sieving the herb or the plant after immersion; and drying the herb or plant which has been sieved in this way at a temperature of between approximately 50° C. and 65° C. up to the point where its water activity is of the order of 0.3 to 0.6, for a residual water content of the order of 10 to 20%, so as to obtain a dried herb or plant which rehydrates rapidly and which has improved organoleptic qualities.

8. A process for treating an aromatic plant or herb, or a plant containing essential oils, which comprises:

providing a fresh herb or plant which has been harvested recently;

immersing this herb or plant in an aqueous solution which comprises at least 80% by weight of water and has additives including:

at least one stabilizer selected from the group comprising sorbitol, a polyol such as mannitol, xylitol, glycerol, a sugar such as sucrose, glucose, lactose, maltodextrin of $12 \leq DE \leq 30$ or equivalent, in a proportion by weight of between 5% and 10% approximately;

at least one antioxidant selected from the group comprising ascorbic acid, sodium ascorbate, alphatocopherol, butylhydroxyanisole, butylhydroxytoluene, sodium sulfite, sodium hydrogen sulfite, sodium disulfite, potassium disulfite and calcium sulfite or equivalent, in a proportion by weight of between 1.5% and 3% approximately;

at least one agent which reduces the water activity selected from the group comprising calcium chloride, sodium chloride, orthophosphoric acid, sodium lactate and calcium lactate or equivalent, in a proportion by weight of between 0.5% and 1% approximately;

this solution having a dry-matter content of 7 to 8% approximately, a pH at 20° C. of between 2.5 and 3.5 approximately, a temperature between approximately 35° C. and 55° C. and, preferably, as close to 35° C. as possible, the immersion duration being of the order of several minutes;

draining the herb or the plant after immersion;

deep-freezing the herb or plant, which has been drained in this way;

immersing this herb or plant, which has been deep-frozen in this way, with agitation, in an aqueous solution comprising at least 60% by weight of water and having additives including:

at least one stabilizer selected from the group comprising sorbitol, a polyol such as mannitol, xylitol, glycerol, a sugar such as sucrose, glucose, lactose, maltodextrin of $12 \leq DE \leq 30$ or equivalent, in a proportion by weight of between 15% and 40% approximately;

at least one antioxidant selected from the group comprising ascorbic acid, sodium ascorbate, alphatocopherol, butylhydroxyanisole, butylhydroxytoluene, sodium sulfite, sodium hydrogen sulfite, sodium disulfite, potassium disulfite and calcium sulfite or equivalent, in a proportion by weight of between 0.15% and 0.5% approximately;

at least one flavor retainer selected from the group comprising gum arabic, carboxymethylcellulose, modified starch or equivalent, ethyl maltol, in a proportion by weight of between 0.9% and 1.8% approximately;

at least one taste enhancer such as monosodium glutamate or equivalent, in a proportion by weight of between 1% and 2% approximately;

this solution having a dry-matter content of 25 to 40% approximately, a pH at 20° C. of between 4.5 and 6.5 approximately, a temperature of between 10° C. and 50° C. and, preferably, equal to, or close to, 20° to 30° C. approximately, the duration of immersion, which is inversely proportional to the temperature, being 15 and 50 minutes approximately, and preferably between 30 and 40 minutes approximately;

sieving the herb or the plant after its immersion; and drying the herb or plant which has been sieved in this way at a temperature of between approximately 50% and 65% up to the point where its water activity is of the order of 0.3 to 0.6, for a residual water content of the order of 10 to 20%, so as to obtain a dried herb or plant which can be rehydrated rapidly and has improved organoleptic qualities.

9. The process as claimed in claim 8, wherein the herb or the plant is deep-frozen in accordance with the IQF "Individual Quick Freezing" process.

10. A process for treating an aromatic plant or herb, or a plant containing essential oils, which comprises:

providing a fresh herb or plant which has been harvested recently;

bringing the herb or plant into contact with an aqueous solution with additives capable of effecting the enzyme blocking thereof;

deep-freezing the herb or plant;

bringing the herb or plant in the deep-frozen state into contact with an aqueous solution with additives capable of effecting the impregnation of the defrosted herb or plant with the purpose of sequestering the water and the flavors which it contains;

drying and dehydrating the herb or plant at a moderate temperature up to the point where its water activity is lower than 0.6 approximately, for a residual water content of less than 20%.

* * * * *